Sept. 22, 1959 M. J. HILLMAN 2,905,876
ON-AND-OFF VELOCITY SERVOSYSTEM
Filed April 8, 1957 5 Sheets-Sheet 1

Murray J. Hillman
INVENTOR

BY
*Forrest Hill*
ATTORNEY

FIG. 3

Murray J. Hillman
INVENTOR

BY *Forrest J. Lilley*
ATTORNEY

Sept. 22, 1959    M. J. HILLMAN    2,905,876
ON-AND-OFF VELOCITY SERVOSYSTEM
Filed April 8, 1957    5 Sheets-Sheet 4

Murray J. Hillman
INVENTOR

BY

ATTORNEY

Sept. 22, 1959　　　　　　　M. J. HILLMAN　　　　　　　2,905,876
ON-AND-OFF VELOCITY SERVOSYSTEM Filed April 8, 1957　　　　　　　　　　　　　　　　5 Sheets-Sheet 5

FIG. 6

Murray J. Hillman
INVENTOR

BY

ATTORNEY

2,905,876
ON-AND-OFF VELOCITY SERVOSYSTEM

Murray J. Hillman, West Covina, Calif., assignor to Hycon Mfg. Company, Pasadena, Calif., a corporation of Delaware Application April 8, 1957, Serial No. 651,513

32 Claims. (Cl. 318—327)

The present invention relates generally to servo systems and more particularly to a time sharing servo system.

Servo systems frequently employ velocity sensing elements to secure a rate signal usable for derivative control of the system. A common device which is often used as the sensing element is a tachometer. This device is essentially a small electrical generator which develops an output voltage proportional to the velocity at which the tachometer is driven. The velocity sensing element, for example, the tachometer mentioned, is an auxiliary component and must be added to a servo system strictly for obtaining a rate signal.

It is an object of this invention to provide a time sharing servo in which the back E.M.F. of a drive motor is utilized in lieu of the output provided by auxiliary velocity sensing means.

Another object of the invention is to provide a D.C. amplifier version of a time sharing servo which responds in driving a load according to the magnitude of a reference input signal.

Another object of the invention is to provide an A.C. amplifier version of a time sharing servo having virtually no drift and capable of higher loop gain than a comparable D.C. amplifier servo.

A further object of this invention is to provide a time sharing servo in which a high power output is obtained to drive a mechanical load.

Summarized briefly, the present system makes use of a motor coupled to drive a mechanical load according to the magnitude of a reference signal. The motor is periodically de-energized, and its back E.M.F. sampled and compared with the reference signal. Thus there is derived an error signal, and this is stored in a storage capacitor. When the motor is again energized, the stored error signal is used to control the voltage at which it is energized in such a way as to reduce any previous error.

The invention possesses other objects and features, some of which together with the foregoing, will be set forth in the following description of a preferred embodiment of the invention, and the invention will be more fully understood by reading the description with joint reference to the attached drawings, in which.

Figure 1:
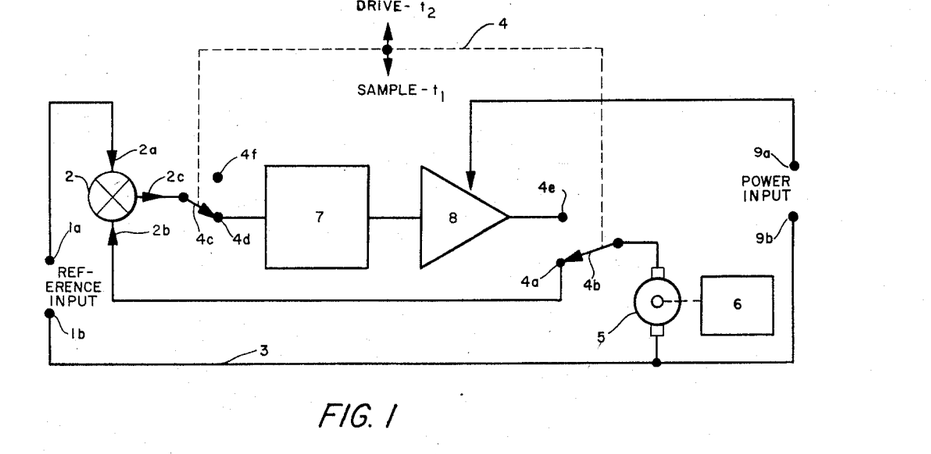
Figure 1 is a schematic block diagram of a time sharing servo.

A schematic block diagram of the invention is shown in Figure 1 of the accompanying drawings. A reference input signal is applied to input terminals 1a and 1b. Terminal 1a is connected to one input terminal 2a of comparator 2, and terminal 1b is connected to a common return lead 3. Another input terminal 2b of comparator 2 is connected to a terminal 4a of a double pole, two position switch 4. Pole 4b is connected to one side of a motor 5, the other side of the motor 5 being connected to common lead 3. The motor 5 is mechanically connected to drive a mechanical load 6.

Output terminal 2c of comparator 2 is connected to pole 4c of switch 4, and terminal 4d of the switch 4 is connected to a storage element 7. The output of storage element 7 is connected to an amplifier 8 having an output lead connected to terminal 4e of switch 4. A source of power is connected across power input terminals 9a and 9b. Terminal 9a is connected to amplifier 8 and supplies power thereto. Terminal 9b is connected to the common return lead 3.

The poles 4b and 4c are ganged together and are simultaneously switched up and down alternately between their respective switch position terminals. In the down switch position indicated in Figure 1, the reference input signal appearing on terminal 1a is compared with the back E.M.F. of the motor 5 appearing on input 2b, by the comparator 2, and the resultant error signal from comparator 2 charges the storage element 7 according to the output of the comparator 2. This action takes place during the sampling interval $t_1$ when the poles of switch 4 assume the down position.

During the driving interval $t_2$, the poles of switch 4 are actuated to the up position such that pole 4c makes with terminal 4f and pole 4b makes with terminal 4e. The output of comparator 2 is thus disconnected from storage element 7 but the motor 5 is connected to the output of amplifier 8. The storage element 7 supplies the stored error signal energy to amplifier 8 which, in turn, controls the power input to the motor 5, energizing it with a power level that tends to minimize the previous error. The motor 5 is controlled proportionately according to the reference input signal applied on terminals 1a and 1b.

Motor 5 is thus used as a combined prime mover and velocity sensing element in a time sharing servo system. The back E.M.F. of a driving motor is utilized in lieu of an output provided by a tachometer or other velocity sensing element in velocity servos.

Figure 2A:
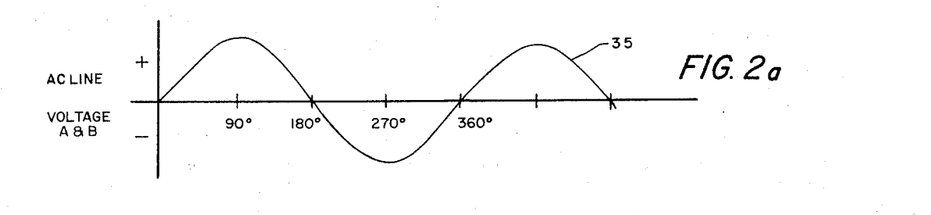
Figures 2a, 2b and 2c show waveforms which illustrate the operation of the circuit of Figure 3.
Figure 2B:
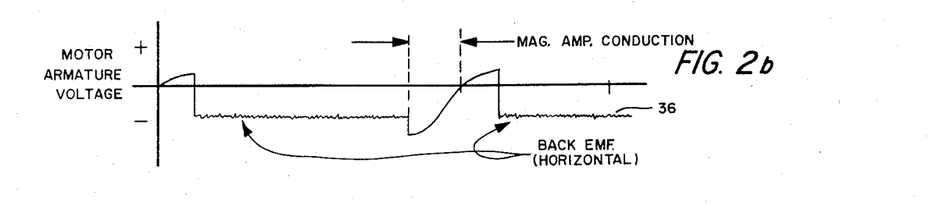
Figure 2C:
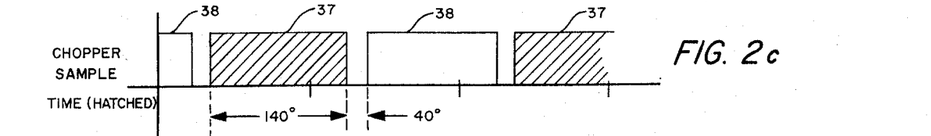
Figure 3:
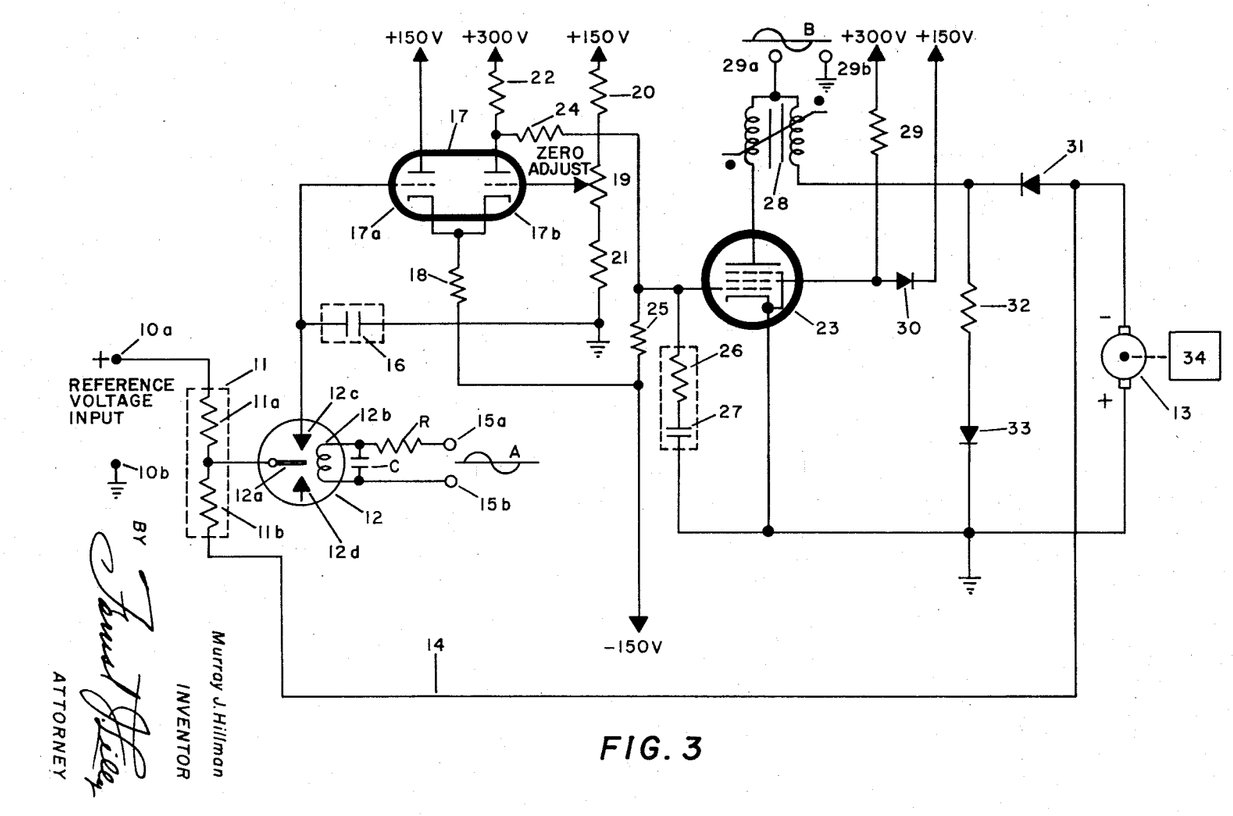
Figure 3 is a D.C. amplifier version of a preferred embodiment of the invention.

Figures 2a, 2b and 2c show three waveforms which describe the operation of the circuit of Figure 3, which is one version of a preferred embodiment of the invention. Referring first to Figure 3, a reference input signal is applied to input terminals 10a and 10b. Terminal 10a is connected to a resistor 11a and terminal 10b is connected to ground. The resistor 11a is connected in series with resistor 11b and the common junction of the two resistors is connected to the pole 12a of chopper 12. The other end of resistor 11b is connected to the negative terminal of motor 13 by lead 14. Motor 13 preferably has a permanent magnet field. The two resistors 11a and 11b are equal in size and comprise a comparator 11 having two inputs at the ends of the series combination of resistors and an output from the common junction thereof.

The output from comparator 11 is the error signal and is fed to the chopper 12 which is driven by A.C. line voltage A applied to terminals 15a and 15b. The line voltage A is supplied to energizing coil 12b through a phasing network comprising series resistor R and shunt capacitor C. The values of resistor R and capacitor C are chosen to adjust the operation of chopper 12 to conform generally with the waveform of Figure 2c, relative to line voltage (Figure 2a). This will be more fully explained later.

Terminal 12c of chopper 12 is connected to one side of capacitor 16, the other side of which is connected to ground. Terminal 12d is left disconnected. Capacitor 16 is the storage element whose output is amplified by differential D.C. amplifier 17, when the chopper pole 12a is in the down position. During this time interval, the stored charge on capacitor 16 is applied to the control grid of triode section 17a. The anode of triode section 17a is connected to +150 volts D.C. and the cathode thereof is connected to −150 volts D.C. through a common cathode resistor 18. Triode section 17a is normally conducting, varying with the charge on capacitor 16.

Triode section 17b is also normally conducting, balancing the current in triode section 17a, the control grid of 17b being connected to a positive potential derived from adjustable resistor 19 which is connected in series with resistors 20 and 21. The resistor 20 is connected to +150 volts D.C. and resistor 21 is connected to ground as shown. The anode of triode section 17b is connected to +300 volts D.C. through plate load resistor 22 and the anode is additionally coupled to the control grid of a control pentode 23 through resistor 24. The control grid of control tube 23 is connected to a negative bias of −150 volts D.C. through resistor 25, and also to ground by a servo stabilizing network comprising a series combination of resistor 26 and capacitor 27. This is a conventional integral stabilizing network and can be connected in any suitable location in the servo loop after the sampler (chopper) 12. The grid of tube 23 affords a convenient, high impedance (no loading effect) connection point.

A magnetic amplifier 28 is connected in the plate circuit of the control tube 23. The anode of tube 23 is connected to terminal 29a through the primary winding of magnetic amplifier 28. Terminal 29b is connected to ground and line voltage B is applied to terminals 29a and 29b. The suppressor grid of control tube 23 is connected to the cathode thereof, as usual, the cathode being connected to ground. The screen grid of tube 23 is connected to +300 volts D.C. through resistor 29 and also to +150 volts D.C. through a rectifier 30 which is used to stabilize the screen grid at +150 volts.

The secondary winding of magnetic amplifier 28 is used to connect terminal 29a to a rectifier 31 which is, in turn, connected to the negative terminal of motor 13. The rectifier 31 is inserted in a reversed orientation and connects the output of magnetic amplifier 28 to motor 13. Resistor 32 is also connected to the magnetic amplifier output and series rectifier 33 connects resistor 32 to ground. The motor 13 is mechanically coupled to drive a mechanical load 34.

The operation of the circuit of Figure 3 can best be explained by reference to the waveforms of Figures 2a, 2b and 2c. The A.C. line voltages A and B are both illustrated by the single waveform curve 35 which is a sine wave signal of the order of 150 volts, 400 c.p.s., for example. The reference voltage input applied to terminals 10a and 10b is a D.C. signal which can, for example, vary from approximately 200 millivolts to 6 volts. The chopper 12 is phased by resistor R and capacitor C so that the storage capacitor 16 is connected to comparator 11 only while the armature of motor 13 is coasting.

The curve 36 of Figure 2b illustrates the armature voltage waveform of motor 13. Assume that during the sampling time, when chopper pole 12a is contacting terminal 12c, the back E.M.F. of the motor 13 appearing on lead 14 is less negative in magnitude than the positive potential of the reference voltage input appearing on terminals 10a and 10b. This is the condition when motor velocity is too low. A positive voltage output is obtained from comparator 11 which, through chopper 12, provides a positive charge to the storage capacitor 16 which it stores as a direct voltage.

During the ensuing driving interval, when chopper pole 12a is in the down position, triode section 17a conducts more current because of a higher control grid potential due to the positive charge on storage capacitor 16. This causes a higher voltage drop across cathode resistor 18, raising the cathode potential of triode section 17b and reducing the current through it. The anode of triode section 17b consequently rises in potential and is applied to the control grid of the magnetic amplifier control tube 23. It should be noted that resistor 19 is adjusted to obtain balanced conduction through both triode sections 17a and 17b for no error signal output from the comparator 11 during the sampling time interval, i.e., for an uncharged storage capacitor 16 during the driving interval.

The voltage amplified by the differential D.C. amplifier 17 is applied as a "speed-up" signal to the magnetic amplifier control tube 23. When the control grid of tube 23 is raised sufficiently in potential, tube 23 will conduct on the positive half of the sine waveform of line voltage B. The magnitude of conduction through tube 23 determines when, how quickly, the magnetic amplifier 28 will fire (conduct through the secondary) during the following negative half cycle. When tube 23 is held cutoff, for example, a biasing current flows during the positive half cycle of B through the secondary of magnetic amplifier 28 to ground through resistor 32 and series rectifier 33. The action of this biasing current is to reset the flux in the magnetic amplifier 28 such that current during the following negative half cycle is suppressed from flowing to motor 13 via rectifier 31. When the control grid of tube 23 is raised above cutoff, however, and the tube 23 conducts, the flow of current through the primary winding cancels the flux condition produced by current through the secondary winding by way of resistor 32 and rectifier 33 such that current flow during the following negative half cycle of B is permitted to motor 13 through the rectifier 31. The magnitude of conduction through tube 23 determines how quickly the magnetic amplifier will "fire" during the negative half cycle by counteracting the flux condition due to the biasing current flow. The greater the tube 23 conduction, the quicker will conduction in the secondary occur during the following negative half cycle. Of course, plate current of tube 23 is cut off during the negative half cycle and is effectively equivalent to an infinite resistance (open circuit). During the negative half cycle the screen grid tends to conduct very heavily but the maximum current is limited by resistor 29, keeping dissipation at a safe level.

Thus, the motor 13 is proportionately energized during a driving interval and accordingly increases the speed of the motor and the driven load 34 when a positive charge is provided on storage capacitor 16. The speed-up of motor 13, during the next sampling interval, reduces the error signal from comparator 11 and the storage capacitor 16 will see a new, smaller signal. The cumulative effect, therefore, is to minimize the difference in magnitude between motor back E.M.F. and the reference voltage input such that motor 13 is controlled proportionately according to the reference input signal. Excessive motor velocity produces a negative output signal from comparator 11 which charges storage capacitor 16 oppositely and is also corrected by similar reasoning.

The magnetic amplifier conduction interval is indicated in Figure 2b and begins with a fairly sharp drop. The curve 36 depicts motor armature voltage and the inductive effect of the motor armature winding is such as to cause the motor armature voltage to follow the sinusoidal line voltage into a portion of the positive cycle. It is observed that motor armature voltage drops sharply and resumes a relatively constant negative back E.M.F. level for the next sampling interval. The sampling intervals ($t_1$) are about 140 degrees wide as indicated by the cross hatched areas 37 in Figure 2c. The intervening areas 38 represent the time ($t_2$) that the chopper pole 12a makes with terminal 12d, and the space of about 40 degrees between adjacent areas represents transfer time for the pole 12a to switch from one chopper terminal to the other.

Component values which have provided a highly satisfactory D.C. time sharing servo are as follows:

| | |
|---|---|
| R | None required for this particular type chopper 12. |
| C | Do. |
| 11a | 300K ohms. |
| 11b | 680K ohms. |
| 12 | Oak NC 401 chopper. |
| 13 | D.C. motor with permanent magnet field, 60 volts D.C. max. |
| 16 | .01 mf. |
| 17a, 17b | 12AT7. |
| 18 | 200K ohms. |
| 19 | 3K ohms. |
| 20 | 430K ohms. |
| 21 | 1.5K ohms. |
| 22 | 510K ohms. |
| 23 | 6AH6. |
| 24 | 1M ohms. |
| 25 | 2M ohms. |
| 26 | 27K ohms. |
| 27 | 4 mf. |
| 28 | Toroidal magnetic amplifier manufactured by Rayco, Pasadena, California. |
| 29 | 27K ohms. |
| 30 | 1 N 34 Germanium diode. |
| 31 | 1 N 334 Transitron silicon diode. |
| 32 | 10K ohms. |
| 33 | 1 N 334 Transitron silicon diode. |

Figure 4:
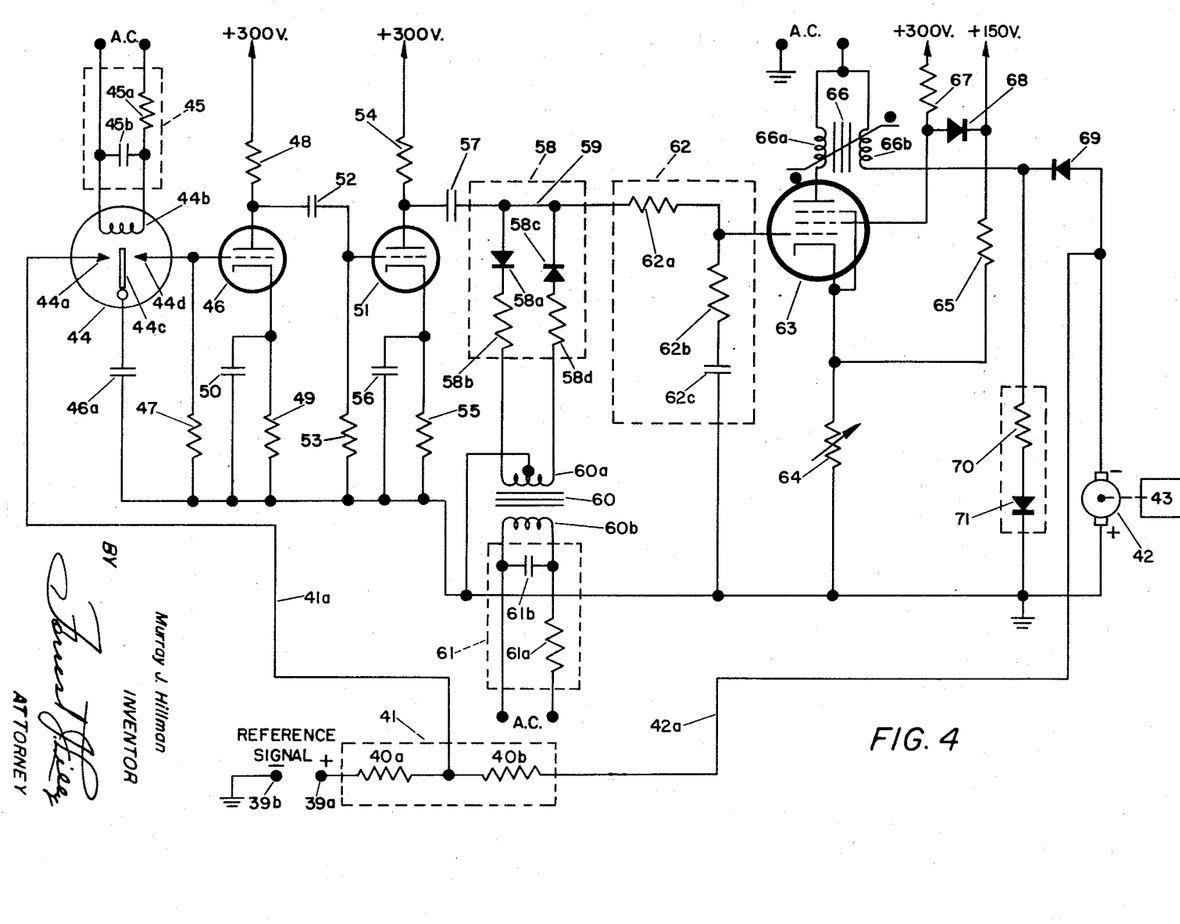
Figure 4 is an A.C. amplifier version of a preferred embodiment of the invention.

Another version of the invention is shown in Figure 4 which illustrates a preferred embodiment of a time sharing servo using carrier type A.C. amplification. A reference input voltage is applied between input terminals 39a and 39b. Terminal 39a is connected to a resistor 40a of comparator 41, and terminal 39b is grounded. The resistor 40a is connected in series with resistor 40b which is in turn connected to the negative terminal of motor 42 through lead 42a. The positive terminal of motor 42 is grounded and the motor is mechanically coupled to drive a mechanical load 43, as for the D.C. case.

The output of the comparator 41 is connected to the left position terminal 44a of chopper 44 through lead 41a. The chopper 44 is energized and driven through coil 44b which is excited by an A.C. signal fed through a phasing network 45 comprising series resistor 45a and shunt capacitor 45b. The values of these elements are chosen, as before, such that the storage capacitor 46a samples the comparator 41 through pole 44c and terminal 44a during the back E.M.F. interval when the armature of motor 42 is coasting.

The right position terminal 44d of the chopper 44 is connected to the control grid of electron tube 46. The control grid of tube 46 is returned to ground through resistor 47. The anode of tube 46 is connected to +300 volts D.C. through plate resistor 48, and the cathode is connected to ground through cathode resistor 49, which is shunted by bypass capacitor 50. The anode of tube 46 is coupled to the control grid of another electron tube 51 through coupling capacitor 52. The control grid of tube 51 is returned to ground through resistor 53. The anode of tube 51 is similarly connected to +300 volts D.C. through plate resistor 54, and the cathode is connected to ground through cathode resistor 55, which is bypassed by capacitor 56. The tubes 46 and 51 are connected as a conventional two stage A.C. amplifier.

The amplifier output is coupled by capacitor 57 from the anode of tube 51 to a keyed clamp demodulator 58. A square wave (carrier) is obtained from capacitor 46a through the cyclic sampling action of the chopper 44 which is amplified by the tubes 46 and 51. The amplifier output is demodulated into a positive or negative D.C. voltage by the keyed clamp demodulator 58, depending on the relative phase between the carrier signal and the A.C. line signal. Demodulator 58 includes a rectifier 58a connecting lead 59, through series resistor 58b, to one side of the secondary winding 60a of a transformer 60. Another rectifier 58c, connected in reverse orientation to rectifier 58a, is connected from lead 59 to the other side of the secondary winding 60a through resistor 58d. Secondary winding 60a is center tapped to ground, and the primary winding 60b is connected to an A.C. signal through a phasing network 61 comprising series resistor 61a and shunt capacitor 61b. The values of resistor 61a and capacitor 61b are selected such that the secondary 60a is excited to operate in phase with the chopper 44, and the left side of secondary winding 60a is positive when pole 44c contacts terminal 44d.

The output of demodulator 58 is connected through a servo stabilizing and filtering network 62 to the control grid of electron tube 63. Network 62 includes series resistor 62a connecting the output of demodulator 58 to the control grid of tube 63, and the series combination of resistor 62b and capacitor 62c connects the control grid to ground.

The cathode of tube 63 is connected to ground through adjustable resistor 64, and is also connected to +150 volts D.C. through resistor 65. Resistor 64 (and 65) provides zero adjustment for the system and controls the conduction of tube 63 by adjusting cathode potential, relative to impressed control grid potential. With these exceptions, the rest of the circuit is the same as shown before, for Figure 3. Magnetic amplifier 66 is connected through one winding 66a to a source of A.C. voltage from the plate of tube 63, and the screen grid of tube 63 is connected to +300 volts D.C. through resistor 67 and also to +150 volts D.C. through a voltage stabilizing rectifier 68. The other winding 66b of magnetic amplifier 66 connects the source of A.C. voltage to the negative terminal of motor 42 through rectifier 69. Similarly to Figure 3, the common junction of winding 66b and rectifier 69 is connected to ground through the series combination of resistor 70 and rectifier 71, which is the magnetic amplifier bias network.

Assuming that the motor 42 is running too slow (than called for by the reference signal), the lower back E.M.F. appearing on lead 42a when compared with the reference input signal will produce a positive output signal on lead 41a. When pole 44c contacts position terminal 44a during the sampling interval, the storage capacitor 46a charges to a positive voltage which is impressed on the control grid of tube 46 during the time that pole 44c contacts terminal 44d. This signal is amplified through tubes 46 and 51 and a square wave is presented to the keyed clamp demodulator 58 when the left side of secondary winding 60a is positive. This prevents rectifiers 58a and 58c from conducting during the positive half of the square wave. However, during the negative half of the square wave, rectifiers 58a and 58c conduct heavily due to the reversed secondary voltage of transformer 60. This clamps the negative half square wave to ground, thereby producing a positive average value of voltage out of the servo stabilizing and filtering network 62. Transformer 60 produces a sufficiently high secondary voltage such that the keying level is always greater than the amplifier output signal. Thus, the control grid of tube 63, through network 62 and particularly resistor 62a, is increased in potential causing increased conduction of the tube 63 to control the firing of magnetic amplifier 66 exactly as described before for Figure 3.

Figure 5A:
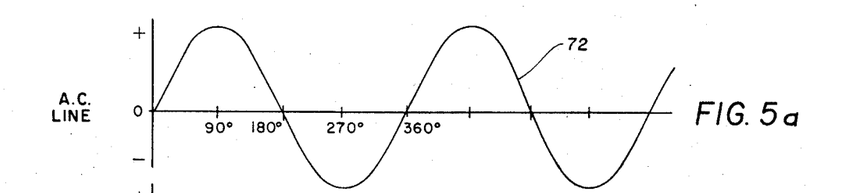
Figures 5a, 5b, 5c, 5d and 5e show waveforms which illustrate the operation of the circuit of Figure 4.
Figure 5B:
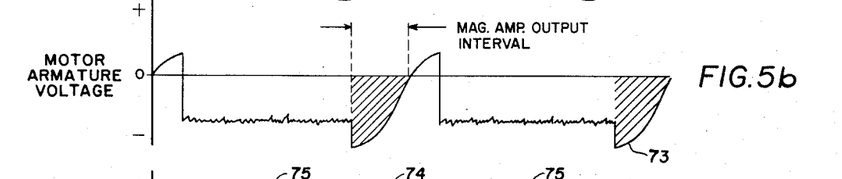
Figure 5C:
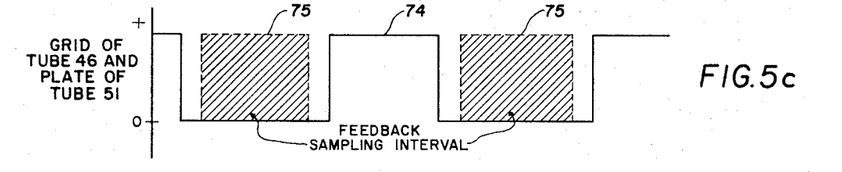
Figure 5D:
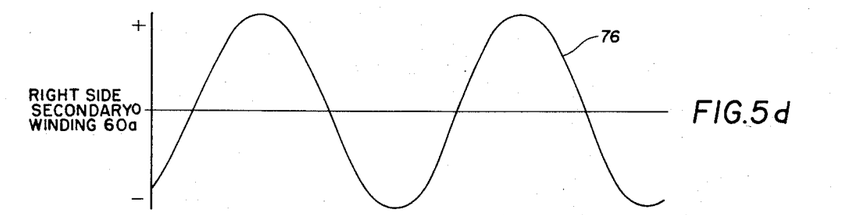
Figure 5E:
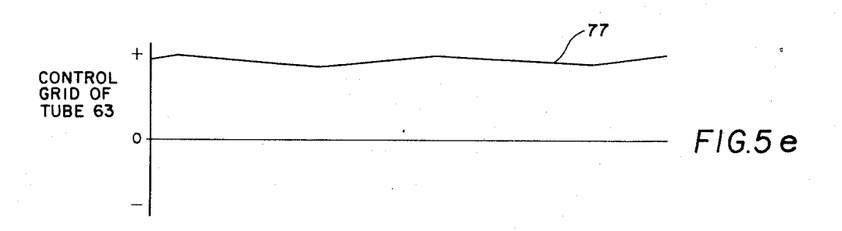

Waveforms which illustrate the operation of the circuit of Figure 4 for insufficient motor velocity conditions are shown in Figures 5a, 5b, 5c, 5d and 5e. Figures 5a and 5b show waveforms 72 and 73 which are similar to the waveforms 35 and 36 respectively in Figures 2a and 2b. The magnetic amplifier output interval is indicated in Figure 5b and is similar to that shown in Figure 2c. In Figure 5c, however, the grid potential of tube 46 and the corresponding plate potential of tube 51 is plotted to illustrate the square wave 74 output due to chopper action with the storage capacitor 46a. The back E.M.F. sampling interval is generally indicated by the cross hatched areas 75. Chopper sampling interval is approximately 140 degrees and transfer time equivalent to about 40 degrees, as before. The potential variation of the right side of secondary winding 60a is plotted as waveform 76 in Figure 5d, and the resultant potential on the control grid of tube 63 is shown as waveform 77 in Figure 5e. The right side of secondary winding 60a is positive during the sampling interval 75 and is negative through the driving interval when the grid of tube 46 and the plate of tube 51 are positive. The magnetic amplifier output interval is within the driving interval during which the potential of the control grid of tube 63 rises a little (waveform 77). The potential, however, falls during the sampling interval when the control grid of tube 46 is at ground potential.

If motor velocity is greater than that called for by the reference signal, the storage capacitor 46a will acquire a negative voltage and consequently the phase of the square wave 74 (Figure 5c) will reverse. The positive half of the square wave output from the amplifier is clamped to ground and this produces a negative output from the keyed clamp demodulator 58 and filtering network 62, producing a decrease in motor driving power from the magnetic amplifier 66. This action, of course, is similar to the operation of the D.C. time sharing servo previously described and shown in Figure 3. The A.C. version of the invention has virtually no drift, and is capable of a higher loop gain for a given number of tubes.

Component values which have yielded a very satisfactory A.C. time sharing servo are as follows:

| | |
|---|---|
| 40a | 300K ohms. |
| 40b | 680K ohms. |
| 42 | D.C. motor with permanent magnet field, 60 volts D.C. max. |
| 44 | Oak NC 401 chopper. |
| 45a | None required for this particular type chopper 44. |
| 45b | Do. |
| 46 | ½ 12AT7. |
| 46a | .01 mf. |
| 47 | 3M ohms. |
| 48 | 510K ohms. |
| 49 | 5.1K ohms. |
| 50 | 100 mf. |
| 51 | ½ 12AT7. |
| 52 | .01 mf. |
| 53 | 1M ohms. |
| 54 | 22K ohms. |
| 55 | 150 ohms. |
| 56 | 100 mf. |
| 57 | .22 mf. |
| 58a | 1 N 34. |
| 58b | 4.7K ohms. |
| 58c | 1 N 34. |
| 58d | 4.7K ohms. |
| 60 | 45–0–45 volts R.M.S. secondary. |
| 61a | Determined in operation. |
| 61b | Do. |
| 62a | 1M ohms. |
| 62b | 27K ohms. |
| 62c | 4 mf. |
| 63 | 6AH6. |
| 64 | 500 ohms. |
| 65 | 15K ohms. |
| 66 | Toroidal magnetic amplifier manufactured by Rayco, Pasadena, California. |
| 67 | 27K ohms. |
| 68 | 1 N 34. |
| 69 | 1 N 334 Transitron silicon diode. |
| 70 | 10K ohms. |
| 71 | 1 N 334 Transitron silicon diode. |

Figure 6:
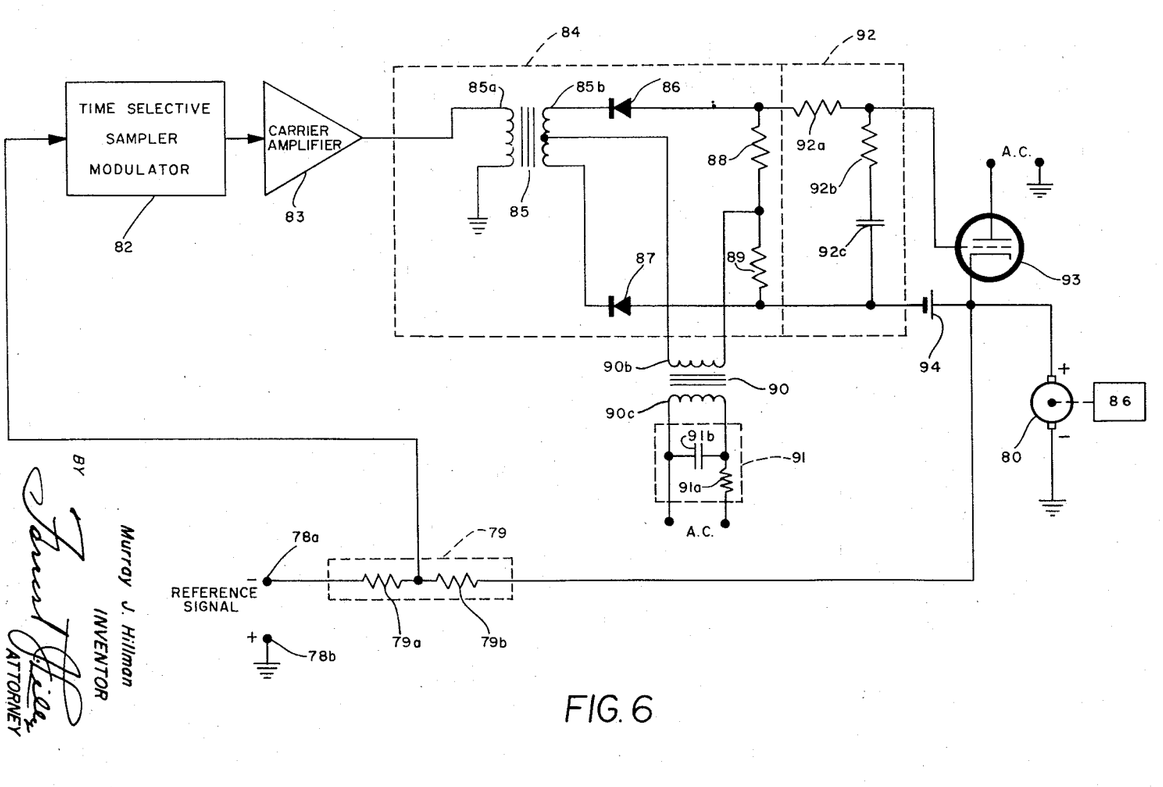
Figure 6 shows a modification of the A.C. amplifier version of the invention.

A variation of the A.C. version of a time sharing servo is shown in Figure 6. A negative reference signal is applied to input terminals 78a and 78b. Terminal 78a is connected to resistor 79a of comparator 79, and terminal 78b is connected to ground. Resistor 79a is connected to the positive terminal of motor 80 through resistor 79b. The negative terminal of motor 80 is connected to ground, and motor 80 is mechanically coupled to drive a mechanical load 81.

The output of comparator 79 is fed to a time selective sampler-modulator 82, and the sampler-modulator 82 output is amplified by carrier amplifier 83. These two devices can be similar to those previously shown in Figure 4, of course. The output from amplifier 83 is fed to a demodulator network 84 which includes a transformer 85. The output from amplifier 83 is connected to the primary winding 85a of transformer 85. Rectifiers 86 and 87 are connected to each end of the secondary winding 85b, and resistors 88 and 89 are respectively connected to these rectifiers 86 and 87. The other ends of resistors 88 and 89 are joined and connected to a center tap on the secondary winding 85b through another secondary winding 90b of a transformer 90. The primary winding 90a of transformer 90 is energized by an A.C. signal through a phasing network 91 comprising series resistor 91a and shunt capacitor 91b.

The output of demodulator 84 is connected to a servo stabilizing and filter network 92 including resistor 92a, resistor 92b and capacitor 92c. The network 92 is similar to the network 62 of Figure 4, the input of network 92 being connected to the ends of resistors 88 and 89 that are connected respectively to rectifiers 86 and 87. The output from servo stabilizing and filter network 92 is obtained across the series combination of resistor 92b and capacitor 92c, the end of resistor 92b being connected to the control grid of electron tube 93 and the end of capacitor 92c being connected to the cathode through a negative bias source 94. A source of A.C. signal is connected to the anode of tube 93 and the cathode directly connected to the positive terminal of motor 80. The tube 93 is a power amplifier for motor 80 and can be a vacuum tube, thyratron, or other power amplifier device.

Assuming that motor velocity is again slower than called for by the reference signal, a negative output signal appears from the comparator 79 in this instance which is operated upon by the sampler-modulator 82 as before and then amplified by the carrier amplifier 83. A positive (in-phase) output is obtained from amplifier 83 where there is a single, or odd number of stages forming the amplifier, and this signal is fed to the primary winding 85a of transformer 85. The secondary winding 85b is connected such that the end connected to rectifier 86 is positive, for a positive output from amplifier 83. Now, the component values of the phasing network 91 are chosen such as to cause a negative potential to appear at the center tap of the secondary winding 85b during the driving interval of the sampler-modulator 82. The rectifiers 86 and 87 can conduct for this condition, but since the positive condition of the secondary winding end connected to rectifier 86 prevents conduction through it, a positive potential is developed at the common junction of resistor 88 and rectifier 86. Rectifier 87 conducts, of course, and the common junction of resistor 89 and rectifier 87 is negative.

Thus, the control grid of tube 93 is raised in potential, increasing conduction through the tube 93 during the positive half cycle of A.C. plate voltage to drive the motor 80. If motor velocity is greater than called for by the reference signal, the phase of the output of amplifier 83 reverses, producing a negative output from demodulator 84 during the driving interval which is applied to the control grid of tube 93, decreasing motor driving power.

From the above description it will be apparent that there is thus provided a device of the character described possessing the particular features of advantage before enumerated as desirable, but which obviously is susceptible of modification in its form, proportions, detail construction and arrangements of parts without departing from the principles involved or sacrificing any of its advantages.

While in order to comply with the statute, the invention has been described in language more or less specific as to structural features. It is to be understood, however, that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A time sharing servo, comprising: a motor and a mechanical load coupled thereto, said motor having an independent and constant field; a source of power for energizing said motor; a voltage comparator; circuits for impressing a reference signal voltage and the back E.M.F. of said motor on said comparator, whereby to produce an error signal; means for storing said error signal; switching means for periodically de-energizing and re-energizing said motor, for causing the back E.M.F. of the motor to be impressed on said comparator when the motor is de-energized; and means for controlling the power level at which said motor is re-energized responsively to the stored error signal.

2. A time sharing servo, comprising: a comparator having first and second inputs and an output, the first input of said comparator being adapted to receive a reference input signal; a motor adapted to drive a mechanical load; a storage element; an amplifier responsively connected to said storage element for supplying power to said motor according to charge on said element; and switching means connecting said amplifier to said motor, said switching means being periodically operated to disconnect said motor from said amplifier, connect said motor to the second input of said comparator, and connect the output of said comparator to said storage element, whereby back E.M.F. of said motor is compared with the reference input signal to produce an error signal in the output of said comparator for periodically charging said storage element.

3. Apparatus in accordance with claim 2 in which said comparator comprises first and second series connected resistors, the first and second inputs of said comparator being obtained at the free ends of said first and second resistors, respectively, and the output of said comparator being obtained at the common junction of said first and second resistors.

4. Apparatus in accordance with claim 2 in which said storage element is a capacitor.

5. Apparatus in accordance with claim 2 in which said switching means includes an electronic chopper.

6. Apparatus in accordance with claim 2 including, in addition, servo stabilizing means.

7. Apparatus in accordance with claim 2 in which said motor is a D.C. motor.

8. A time sharing servo, comprising: a comparator having first and second inputs and an output, the first input of said comparator being adapted to receive a reference input signal; a motor adapted to drive a mechanical load, said motor being connected to the second input of said comparator; a storage element; switching means connecting the output of said comparator to said storage element, said switching means being periodically operated to disconnect said storage element from the output of said comparator; a D.-C. amplifier responsively connected to said storage element for producing an output signal according to charge on said storage element; a source of power for energizing said motor; power control means operatively responsive to the output signal of said D.C. amplifier for supplying power to said motor from said source; and means for isolating said motor from said source of power when said switching means is connecting the output of said comparator to said storage element, whereby back E.M.F. of said motor is compared with the reference input signal to produce an error signal in the output of said comparator for periodically charging said storage element.

9. Apparatus in accordance with claim 8 in which said comparator comprises first and second series connected resistors, the first and second inputs of said comparator being obtained at the free ends of said first and second resistors, respectively, and the output of said comparator being obtained at the common junction of said first and second resistors.

10. Apparatus in accordance with claim 8 in which said storage element is a capacitor.

11. Apparatus in accordance with claim 8 in which said switching means includes an electronic chopper.

12. Apparatus in accordance with claim 8 including, in addition, servo stabilizing means.

13. Apparatus in accordance with claim 8 in which said motor is a D.C. motor.

14. Apparatus in accordance with claim 8 in which said D.C. amplifier is a D.C. differential amplifier including zero adjustment means.

15. Apparatus in accordance with claim 8 wherein said power control means includes an electron control tube, and a magnetic amplifier connected in the plate circuit of said tube, said magnetic amplifier having an output adapted to be connected to said motor.

16. Apparatus in accordance with claim 8 in which said isolating means includes a rectifier connecting said motor to said source of power, said rectifier permitting conduction to said motor only when said storage element is disconnected from the output of said comparator.

17. A time sharing servo, comprising: a comparator having first and second inputs and an output, the first input of said comparator being adapted to receive a reference input signal; a motor adapted to drive a mechanical load, said motor being connected to the second input of said comparator; a storage element; an A.C. amplifier; switching means alternately connecting said storage element to the output of said comparator and to an input of said A.C. amplifier, said A.C. amplifier producing an output according to charge on said storage element; a demodulator connected to an output of said A.C. amplifier for obtaining a D.C. output signal; a source of power for energizing said motor; power control means operatively responsive to the output signal of said demodulator for supplying power to said motor from said source; and means for isolating said motor from said source of power when said switching means is connecting the output of said comparator to said storage element, whereby back E.M.F. of said motor is compared with the reference input signal to produce an error signal in the output of said comparator for periodically charging said storage element.

18. Apparatus in accordance with claim 17 in which said comparator comprises first and second series connected resistors, the first and second inputs of said comparator being obtained at the free ends of said first and second resistors, respectively, and the output of said comparator being obtained at the common junction of said first and second resistors.

19. Apparatus in accordance with claim 17 in which said storage element is a capacitor.

20. Apparatus in accordance with claim 17 in which said switching means includes an electronic chopper.

21. Apparatus in accordance with claim 17 including, in addition, servo stabilizing means.

22. Apparatus in accordance with claim 17 in which said motor is a D.C. motor.

23. Apparatus in accordance with claim 17 wherein said power control means includes an electron control tube, and a magnetic amplifier connected in the plate circuit of said tube, said magnetic amplifier having an output adapted to be connected to said motor.

24. Apparatus in accordance with claim 17 in which said isolating means includes a rectifier connecting said motor to said source of power, said rectifier permitting conduction to said motor only when said storage element is disconnected from the output of said comparator.

25. Apparatus in accordance with claim 17 in which said demodulator is a keyed, clamp demodulator.

26. A time sharing servo, comprising: a comparator having first and second inputs and an output, the first input of said comparator being adapted to receive a reference input signal; a motor adapted to drive a mechanical load, said motor being connected to the second input of said comparator; a time selective sampler-modulator having an input and an output for periodically sampling the output of said comparator and producing a carrier output signal therefrom, the output of said comparator being connected to the input of said sampler-modulator; a carrier amplifier having an input and an output, the output of said sampler-modulator being connected to the input of said carrier amplifier; a demodulator having an input and an output, the output of said carrier amplifier being connected to the input of said demodulator; and a power amplifier device responsively connected to the output of said demodulator for periodically supplying power only outside the sampling time interval to said motor according to the output of said demodulator, whereby back E.M.F. of said motor is compared with the reference input signal to produce an error signal in the output of said comparator only during the sampling time interval of said sampler-modulator.

27. Apparatus in accordance with claim 26 in which said comparator comprises first and second series connected resistors, the first and second inputs of said comparator being obtained at the free ends of said first and second resitors, respectively, and the output of said comparator being obtained at the common junction of said first and second resistors.

28. Apparatus in accordance with claim 26 wherein said sampler-modulator includes a storage capacitor, and an electronic chopper connecting staid storage capacitor alternately to the output of said comparator and to the input of said carrier amplifier.

29. Apparatus in accordance with claim 26 including, in addition, servo stabilizing means.

30. Apparatus in accordance with claim 26 in which said motor is a D.C. motor.

31. Apparatus in accordance with claim 26 in which said demodulator includes a transformer-coupled, keyed phase sensitive demodulator.

32. Apparatus in accordance with claim 26 in which said power amplifier device includes an electron tube having at least a control grid, cathode and anode, the control grid of said electron tube being connected to the output of said demodulator, the anode of said tube being connected to a source of A.C. power, and the cathode of said tube being connected to said motor.

References Cited in the file of this patent

UNITED STATES PATENTS

| | | |
|---|---|---|
| 2,429,257 | Bond | Oct. 21, 1947 |
| 2,534,801 | Siltamaki | Dec. 19, 1950 |
| 2,796,569 | McDonald et al. | June 18, 1957 |